(No Model.)

H. W. LAWRENCE.
ANTIRATTLER FOR THILL COUPLINGS.

No. 573,786. Patented Dec. 22, 1896.

Witnesses
B. P. Shepherd
M. E. Cooley

Inventor
Herbert W. Lawrence
By Paul A. Hawley
his attorneys

UNITED STATES PATENT OFFICE.

HERBERT W. LAWRENCE, OF MONTEVIDEO, MINNESOTA.

ANTIRATTLER FOR THILL-COUPLINGS.

SPECIFICATION forming part of Letters Patent No. 573,786, dated December 22, 1896.

Application filed April 29, 1896. Serial No. 589,600. (No model.)

*To all whom it may concern:*

Be it known that I, HERBERT W. LAWRENCE, of Montevideo, Chippewa county, Minnesota, have invented certain new and useful Improvements in Antirattlers for Thill-Couplings, of which the following is a specification.

The object of this invention is to provide an improved device that may be quickly and readily applied to any form of carriage for the purpose of forming an antirattler for the thills, and also for forming a lock for the nut or bur on the bolt that secures the thill in position.

The invention consists generally in the constructions and combinations hereinafter described, and particularly pointed out in the claims.

Figure 1:
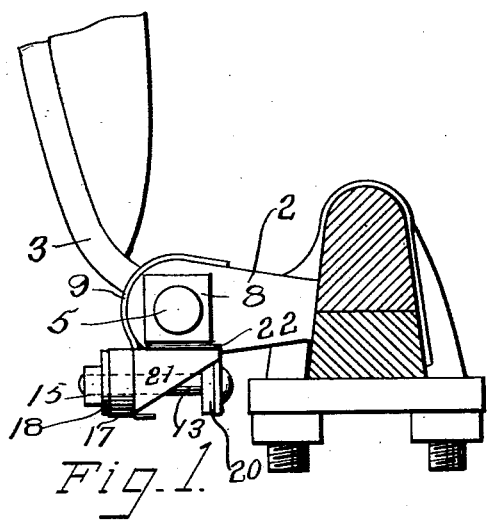
Figure 2:
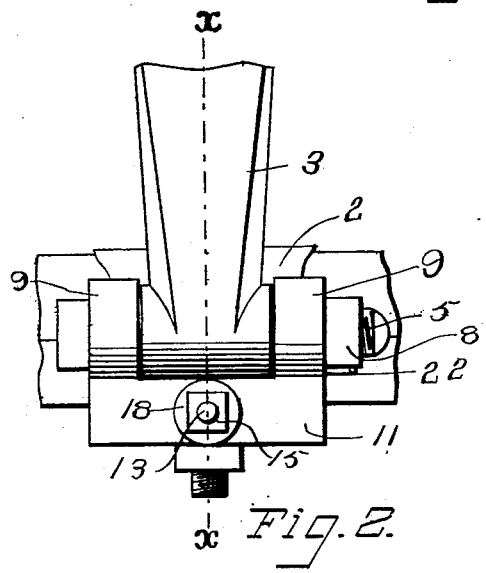
Figure 3:
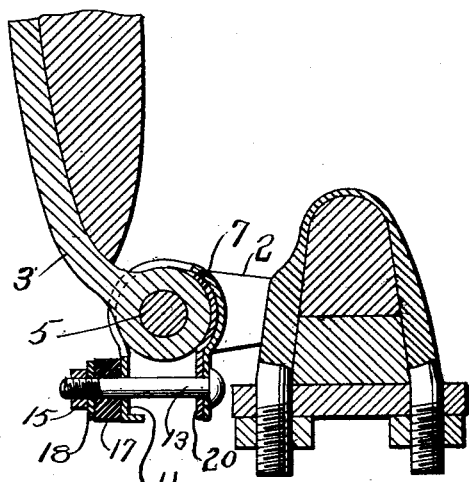
Figure 4:
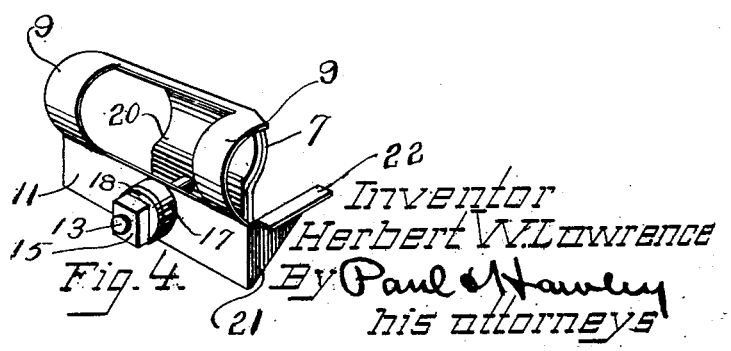

In the accompanying drawings, forming part of this specification, Figure 1 is a section of a carriage-axle, showing a portion of the thill and the thill-coupling with my antirattler applied thereto. Fig. 2 is a plan view of the same. Fig. 3 is a section on the line $x\,x$ of Fig. 2. Fig. 4 is a perspective view showing the antirattler-clip detached.

In the drawings, 2 represents the clip, that is secured to the axle in the ordinary manner and to which the thill-iron 3 is secured by means of the bolt 5. These parts are all of ordinary construction.

My antirattler-clip consists, preferably, of a single piece of sheet metal having the rear depending portion 7, that is adapted to extend down between the two projecting portions of the coupling-clip in the rear of the curved part of the thill-iron. The front part of this clip is provided with the two strips 9, that bear upon the forward ends of the coupling-clip 2. The space between these two strips is open to permit the passage and the free movement of the thill-iron. At the lower ends of these strips is the plate 11, and a bolt 13 passes from the rear through the plate 7 and through the plate 11 and is provided upon its end with the nut or bur 15. A rubber or other spring washer 17 is arranged upon the bolt between the plate 11 and the nut 15. A metallic washer 18 is also preferably arranged between said nut 15 and the spring-washer 17. I prefer also to provide a leather wearing plate or strip 20, which is arranged between the plate 7 and the end of the thill-iron. The plate 11 is also preferably provided at its end with the inturned projection 21, having the lip 22 at its upper edge, and upon this lip the nut 8 of the coupling-bolt 5 rests when the bolt is in place.

In coupling the device the nut is put in position first and the bolt 5 is screwed into place through the nut. The lip 22 on the projection 21 holds the nut from turning and permits the bolt to be inserted or removed by the use of a single wrench. It will be seen that the device may be readily attached to any thill-coupling. It may be quickly put in position or removed and does not interfere with the free movement of the thills. The leather 20 may be renewed whenever it becomes worn, and this is the only part of the device upon which there will be any appreciable wear.

As the strips 9 rest upon the ends of the coupling-clip 2 they are rigidly supported, and by tightening the nut 15 upon the bolt 13 the plate 7 may be drawn against the rear end of the thill-iron with any desired pressure, so as to force the thill-iron forward and hold it closely against the rear side of the bolt 5. This prevents any rattling of the thill-iron upon the bolt 5 and also prevents any rattling of the bolt 5 in the coupling-clip.

Having thus described my invention, I claim as new and desire to secure by Letters Patent—

1. As an article of manufacture, the herein-described antirattling clip, consisting of the plate 7, the curved forward strips 9 and the plate 11, with the bolt 13 extending through the lower part of the plate 7 and through the plate 11, and provided with the nut 15 and spring-washer 17, for the purpose set forth.

2. As an article of manufacture, the herein-described antirattling clip, consisting of a rear curved plate, curved strips extending forward from the opposite ends of said plate, a plate uniting the ends of said curved strips, and a bolt joining said plates and provided with a suitable nut and with a spring-washer, for the purpose set forth.

3. As an article of manufacture, the antirattling clip comprising the plate 7, the curved strips 9 extending forward from the upper edge of said plate, the plate 11 joining the forward ends of said strips 9, and the projection 21 upon the plate 11 provided with the lip 22, for the purpose set forth.

4. The combination, with the coupling-clip, the thill-iron, the coupling-bolt and its nut, of the antirattling clip comprising the plate 7, extending between the parts of the coupling-clip, the strips extending from the upper forward edge of said plate 7 and bearing upon the forward ends of the coupling-clip, the plate 11 joining the lower ends of said strips, the leather plate 20 arranged between said thill-iron and said plate 7, and the bolt 13 passing through said plates 7 and 11 and provided with the spring-washer 17 and the nut 15, for the purpose specified.

In testimony whereof I have hereunto set my hand this 22d day of April, A. D. 1896.

HERBERT W. LAWRENCE.

In presence of—
 B. O. PICKLE,
 ETTA L. GRAHAM.